(12) United States Patent  (10) Patent No.: US 7,780,766 B2
Thompson  (45) Date of Patent: Aug. 24, 2010

(54) REMOVAL OF VAPOR GAS GENERATED BY AN OIL-CONTAINING MATERIAL

(75) Inventor: Delbert Thompson, Greeley, CO (US)

(73) Assignee: Leed Fabrication Services, Inc., Brighton, CO (US)

( * ) Notice: Subject to any disclaimer, the term of this patent is extended or adjusted under 35 U.S.C. 154(b) by 355 days.

(21) Appl. No.: 11/688,947

(22) Filed: Mar. 21, 2007

(65) Prior Publication Data

US 2007/0220850 A1  Sep. 27, 2007

Related U.S. Application Data

(60) Provisional application No. 60/743,801, filed on Mar. 27, 2006.

(51) Int. Cl.
B01D 45/00 (2006.01)

(52) U.S. Cl. .............. 95/272; 95/243; 95/254; 95/262; 55/320; 55/456; 55/457

(58) Field of Classification Search .......... 95/241, 95/243, 252, 262, 272, 274, 288, 211, 267, 95/268; 96/189, 190, 191, 204, 220, 139, 96/152, 290, 295, 296, 297; 55/456, 457, 55/320–337, 512–519; 261/79.1, 79.2, 94–99
See application file for complete search history.

(56) References Cited

U.S. PATENT DOCUMENTS

| 1,649,556 | A | | 11/1927 | Waters |
| 1,752,215 | A | | 3/1930 | Waters |
| 1,994,110 | A | | 3/1935 | Pittman |
| 3,997,303 | A | * | 12/1976 | Newton ............... 95/284 |
| 4,424,068 | A | | 1/1984 | McMillan |
| 4,482,364 | A | | 11/1984 | Martin et al. |
| 4,559,068 | A | * | 12/1985 | Lagerstedt et al. ....... 55/399 |
| 4,581,208 | A | | 4/1986 | The et al. |
| 4,916,914 | A | * | 4/1990 | Short ................... 62/84 |
| 5,531,811 | A | * | 7/1996 | Kloberdanz ............ 95/261 |
| 5,632,962 | A | * | 5/1997 | Baker et al. ............ 422/211 |
| 5,676,717 | A | * | 10/1997 | Cope et al. ............. 55/321 |

(Continued)

OTHER PUBLICATIONS

International Search Report, Corresponding to International Application No. PCT/US07/64597, Mailed Oct. 23, 2007.

(Continued)

Primary Examiner—Robert A Hopkins
Assistant Examiner—Sonji Turner
(74) Attorney, Agent, or Firm—Greenlee, Winner and Sullivan, P.C.

(57) ABSTRACT

The invention provides devices and methods for collecting vapor gas generated by an oil-containing material within a production tank. The devices and associated methods result in produced oil having a reduced level of dissolved hydrocarbons and recovery of vapor gas for resale. The devices include vapor recovery units connected to conventional oil-production units so that a conventional unit is converted to a low emission unit. In an embodiment, the device is a column separator comprising a perforated, packed spiral baffle with one end that receives vapor gas and a second end for removing gas that has traversed the length of the column separator. Also provided are methods for converting an oil-production unit into a low-emission oil production unit using any of the devices disclosed herein.

25 Claims, 7 Drawing Sheets

U.S. PATENT DOCUMENTS

| | | | |
|---|---|---|---|
| 5,772,733 A | 6/1998 | Lokhandwala et al. | |
| 5,985,004 A * | 11/1999 | Boyd | 95/241 |
| 6,293,340 B1 | 9/2001 | Wu | |
| 6,383,367 B1 * | 5/2002 | Grotheim | 208/187 |
| 6,755,250 B2 | 6/2004 | Hall et al. | |
| 6,918,949 B1 | 7/2005 | Peters | |
| 6,962,199 B1 | 11/2005 | Willink | |
| 2004/0154272 A1 * | 8/2004 | McKenzie | 55/423 |

OTHER PUBLICATIONS

Written Opinion of the International Searching Authority, Corresponding to International Application No. PCT/US07/64597, Mailed Oct. 23, 2007.

* cited by examiner

REMOVAL OF VAPOR GAS GENERATED BY AN OIL-CONTAINING MATERIAL

CROSS-REFERENCE TO RELATED APPLICATIONS

This application claims the benefit of U.S. Provisional Application No. 60/743,801, filed Mar. 27, 2006.

BACKGROUND OF THE INVENTION

Oil storage tanks are used to hold oil for brief periods of time and can be a significant source of vapor gas emissions. Oil production units are located immediately upstream from an oil-well and often contain sedimentation storage tanks to separate oil from water. The oil output from the oil production unit is then stored downstream in a relatively large storage tank. These storage tanks are a significant source of vapor emissions. In particular, light hydrocarbons dissolved in the oil, including methane, vaporize and collect in the space between the oil and the storage tank's roof. These vapors can vent into the atmosphere over time. Traditional processes and devices to prevent emission of these light gas vapors involve processing oil before storage by, for example, burning the vapors or venting vapors to the atmosphere, as well as connecting vapor recovery units to the storage tanks. Burning the vapor gas is not, however, an ideal solution as such burning generates, for example, the greenhouse gas carbon dioxide. In addition, it is inherently dangerous to have flame in proximity to oil and the oil storage tanks.

It is important for oil-producers to address vapor gas emissions from oil stored within a storage tank because of the many state and federal regulations that govern emission levels. For example, the Colorado Dept of Public Health and Environment (CDPHE)/EPA is requiring a reduction in vapor gas emissions from oil consisting of a 37.5% reduction in 2005, 47.5% in 2006, and about 70% in 2007. Such restrictions on emissions levels means oil production tanks must be replaced or retrofitted to ensure continued compliance with the stricter guidelines. The present invention provides devices and methods for reducing vapor gas emissions that are both simple and cost-effective, but still comply with a variety of governmental guidelines, including those set by the CDPHE/EPA.

The volume of vapor gas generated by an oil-containing material located within a production unit's separator tank depends on many factors, including the composition of the oil. For example, lighter crude oils (API gravity >40°) vaporize more hydrocarbon vapors than heavier crudes (API gravity <40°). In addition, oil-fields often produce a mixture of oil-containing material and natural gas (e.g. gas obtained directly from the oil-field), as well as oil-containing material that comprises a mixture of oil and water. The pressure and temperature of the oil within the oil-well and the storage tank also affects the volume of gas vaporized from the oil. The composition of the natural gas also varies, although the largest component is methane (about 40% to 60%), with ethane, propone, isobutane, butane, isopentane, and most of the pentanes, hexanes and heptanes also commonly found. Similarly, the composition of gas vaporized from the oil-containing material also varies. Other gas vapors produced may include natural inert gases such as nitrogen and carbon dioxide, and hazardous air pollutants (e.g. benzene, toluene, ethyl-benzene and xylene). The natural and vapor gas contains natural gas and other liquids, so that this natural gas and vapor gas can have a relatively high Btu content (e.g. up to 2000 Btu per standard cubic foot (scf)) compared to that of pipeline quality natural gas (between about 950 and 1100 Btu per scf). As the price of natural gas continues to increase, the ability to successfully harvest natural gas generated from vaporization of oil within a storage tank gains economic importance, in addition to reducing air pollution.

Traditional vapor recovery units are comparatively complex and costly relative to the present invention and may not be suitable for the relatively smaller separation storage tanks commonly used in oil production units immediately downstream of the well-head. For example, those units generally require the use of a compressor and associated components to draw out hydrocarbon vapors from the storage tank under low-pressure. The drawn out vapors are subjected to a suction scrubber to condense and collect liquids. The vapors are then removed from the unit for pipeline sale or onsite fuel supply. The present invention is less complicated, and recovers vapors with a reduction efficiency up to 95% or greater, without the need for a compressor or a suction scrubber.

Disclosures relating to oil and gas separators, as well as oil producing devices (e.g. U.S. Pat. Nos. 1,752,215, 4,424,068, 6,293,340, 1,994,110, 1,649,556, 6,755,250, 4,482,364 and 4,559,068), suffer drawbacks, including being more complicated, inefficient for removing vapor gas from oil within a production tank, and/or requiring more maintenance that the present invention avoids. The present invention is different from many conventional devices in that it does not operate by centrifugally forcing liquid from the gas phase, but rather enhances condensation by increasing the residence time of gas flow within a practically-sized device and promoting reflux of condensed oil within the device.

The methods and devices presented herein alleviate the need for vapor gas combustors to burn off raw gas emissions to satisfy CDPDE/EPA regulations, as well as other state/federal regulations of vapor gas emissions, thereby avoiding the need to address anticipated regulations on combustor exhaust emissions. The invention also provides an increased volume of sales natural gas down the pipeline that is cleaner and dryer compared to those gases obtained from present separator oil-production units. In addition, collecting the vapor gas provides a fuel source that may be utilized by the on-site oil production unit to regulate and modulate operating temperature.

The methods and devices presented herein can operate at a higher temperature than the temperature generally used in a traditional oil production unit. Higher-temperature operating conditions offer several advantages. The sales gas temperature is between about 26° C. to 38° C. (80 to 100 degrees Fahrenheit), thereby reducing freeze problems. Paraffin buildup and related problems are reduced or eliminated. With traditional vapor recovery units, paraffin can clog the unit, requiring increased maintenance. This is avoided in the present invention, as the paraffin is liquefied and is heavier than liquid oil so that paraffin tends to remain in the production tank.

Maintenance is minimized in the present invention because there are no moving parts and few parts that are subjected to wear and/or clogging. The invention is also economical in that there is a short pay-out time period, typically less than 6 months at current natural gas prices, to recover the additional cost of the disclosed devices, including the LEE VGR™ vapor recovery unit.

Another advantage of the present invention is the relatively straight-forward operating parameters. The relatively straightforward operating properties of the present invention result in minimal special operator training; typically less than 30 minutes to educate that a higher operating temperature is important to maximize operation efficiency. In addition, the added components embodied by the present invention are easy to operate and maintain. For example, the column separator of the present invention requires no maintenance or cleaning, and the invention used with other components (e.g. a flash absorber exchanger) commonly found in oil-production units require minimal maintenance on the level controller and valve.

The method by which the low emission element functions is fairly simple and does not require expensive equipment. In fact, pre-existing oil-production units can be retrofitted, avoiding the need for complete replacement or overhaul of existing units to meet increasingly stringent vapor gas emission regulations, thereby minimizing costs and disruption to oil production.

SUMMARY OF THE INVENTION

The present invention is for devices and methods of removing vapor gas produced by an oil-containing material. In particular, the invention provides a device for removing vapor gas generated by an oil-containing material comprising a column separator having a first end and a second end, and a perforated spiral baffle or helicoid flighting located within the column separator and between at least a portion of the longitudinal distance defined by the distance separating the first end and the second end. The baffle surface and the inward-facing wall of the column separator define a cavity within the column separator. In an embodiment, at least a portion of the cavity is packed with a packing material. In a further embodiment the first end of the column separator is connected to a production tank that holds an oil-containing material. In another embodiment the second end of the column separator is connected to a vapor gas remover that removes vapor gas from the device. As used herein, "vapor gas remover" refers to the part of the device that removes vapor gas from the device, thereby decreasing the amount of vapor gas within the storage tank. In an embodiment, a portion or all of the removed vapor gas is piped as "sales gas" to a natural gas pipeline. In an embodiment, at least a portion of the removed vapor gas is used as a fuel source for an oil production unit to which the device is connected. In an embodiment, any of the devices disclosed herein are operably connected to a conventional oil production unit so that the oil production unit is converted to a "low emission" oil production unit.

In an embodiment, the invention is a low emission oil production unit, so that the amount of vapor gas generated by oil output by the oil production unit is reduced by at least 10%, at least 50%, at least 75% or at least 95%, relative to the amount of vapor gas generated by oil output by an oil production unit that does not comprise the present invention.

In an embodiment the column separator has a cylindrical volume. In an embodiment the column separator has a cross-sectional shape (when viewed from the top) that is circular. Such a column separator has an inner diameter and an outer diameter, wherein the wall thickness of the column separator is the difference between the inner and outer radii. In an embodiment, the diameters do not vary as a function of the column separator height. The device can further comprise a pipe, wherein the pipe is in a concentric location relative to the column separator (the pipe runs the longitudinal axis of the column separator and at the center of the column separator). In this embodiment, the perforated spiral baffle has a central longitudinal bore for receiving the pipe, wherein the diameter of the bore is substantially equivalent to the diameter of the pipe, so that the pipe is a "tight-fit" to the baffle. In an embodiment, the baffle spirals around the pipe at least about three times. In an embodiment, the baffle spirals around the pipe between about three and seven times. In an embodiment the baffle spirals around the pipe about five times. In an embodiment, the spiral baffle has an outer diameter dimension that is substantially equivalent to the inner diameter of the cylindrical column separator.

The packing material is any material that increases the viscous drag on the vapor gas, and correspondingly increases the residence time of the vapor gas in the column separator. The packing material also enhances reflux of condensed oil, thereby increasing the efficiency of vapor gas removal. Any packing material that forms a packed bed can be used. In an embodiment, the packing material is selected from the group consisting of a Raschig ring, Lessing ring, partition ring and Pall ring. In an embodiment, the packing material is a Pall ring. In an embodiment, the packing material is a "high performance" Pall ring (see, for example, Amistco Separation Products, Inc., Alvin, Tex.; Nilgiris Chemical Stoneware Co. (Pvt) Ltd.).

In a further embodiment, any of the devices disclosed herein have a vapor gas remover for removing vapor gas from the device. In an embodiment, the vapor gas remover comprises an orifice that is positioned along the sidewall of the column separator, and located near the top of the column separator, for example within the top 10% of the top of the column separator. In an embodiment, the vapor gas remover comprises an additional section connected to the column separator, such that the total height of the device is the sum of the column separator height and vapor gas remover height. In this embodiment, the orifice traverses the wall that contains the vapor gas remover volume. In an embodiment, a pipe is connected to the orifice for collecting, removing and transporting gas from the device to a sales gas pipeline, or back to the oil production unit as a fuel source for temperature regulation. In an embodiment, the vapor gas remover comprises a grate located adjacent or at the column separator second end. In an embodiment, the vapor gas remover further comprises a mist pad, including a mist pad located adjacent to the grate. In an embodiment, a grate is located adjacent to each of the two faces of the mist pad, thereby sandwiching the mist pad.

Any of the devices disclosed herein can be operably connected to an oil-production unit, including a unit that comprises a separation storage tank for separating the oil phase from the water phase. As used herein, "operably connected" refers to one or more elements connected so that a material (e.g. gas) can flow from one element to another element. For example, an operable connection can refer to a device's first end connected to an oil-production unit's tank in such a manner that vapors generated by oil within the production unit's tank are introduced to the separator column's first end.

In an embodiment, the device for removing vapor gas generated by an oil-containing material comprises a column separator having a longitudinal axis, a first and a second end; a perforated spiral baffle spanning at least a portion of said column separator longitudinal axis; and a vapor gas removal element connected to said second end of the column separator. In a further embodiment, a storage tank for holding the oil-containing material is connected to the column separator first end. A grate can be located at the column separator first end for supporting and securing the spiral baffle in place relative to the longitudinal axis of the column separator. In an embodiment, the spiral baffle spans at least 70% the longitudinal length of the column separator. In an embodiment, the spiral baffle spans at least 90% the longitudinal length of the column separator. In an embodiment, the spiral baffle spans substantially the entire longitudinal length of the column separator, including but not limited to, the entire longitudinal length of the column separator.

In an embodiment, a packing material is contained or located in at least a portion of the column separator cavity, where the boundary of the cavity is defined by the interior wall of the column separator, and the surface of the spiral baffle. In an embodiment, at least 70% of the cavity is packed. In an embodiment, at least 80% of the cavity is packed. In an embodiment, at least 95% of the cavity is packed. In an embodiment, substantially all the cavity is packed. In an embodiment the packing material comprises a plurality of pall rings.

Any of the devices disclosed herein can have a cylindrically-shaped column separator. In an embodiment, the cylindrically-shaped column separator further comprises a pipe concentrically located within said cylindrical column separator that traverses the column separator's longitudinal axis. In this embodiment the spiral baffle continuously spirals around this central pipe. In an embodiment, the baffle spirals around the central pipe about five turns.

In an embodiment, any of the devices disclosed herein heat the oil-containing liquid within the production tank to between about 52° C. (125° F.) to about 93° C. (200° F.), including between about 71° C. (160° F.) to about 82° C. (180° F.), thereby heating gas contained within the production tank to a temperature of between about 32° C. (90° F.) to about 93° C. (200° F.), including between about 43° C. (110° F.) and about 52° C. (125° F.), so that the temperature of the column separator is between about 32° C. (90° F.) and 79° C. (175° F.), including between about 46° C. (115° F.) and 57° C. (135° F.), and about 52° C. (125° F.) at the first end. The temperature of the inlet gas at least partially governs the temperature of gas exiting the second end and exiting the vapor gas remover. In an embodiment, the minimum temperature gradient in the column separator (e.g. the temperature difference between gas at the first end and gas at the second end) is about 14° C. (25° F.). The present invention provides the ability to regulate the temperature of the outlet vapor gas to any value, including an exit gas temperature of between about 32° C. (90° F.) to about 49° C. (120° F.). In an embodiment, the temperature of the oil-containing material and gas within the production tank is selected such that the outlet gas temperature is not more than about 49° C. (120° F.). In an embodiment, such an outlet gas temperature is provided by an oil-containing material that is heated to a temperature between 71° C. (160° F.) and 82° C. (180° F.). Heating the oil-containing material to such temperature provides a "boiling" action that enhances vaporization of gas hydrocarbons, thereby increasing vapor gas recovery efficiency.

In an embodiment, any of the devices disclosed herein are operably connected to an oil-production unit, including a unit that has a sedimentation storage tank for separating water phase from the oil phase in the oil-containing material.

In an aspect, the invention provides a method for separating a vapor gas emitted from an oil-containing material in a separator tank. In an embodiment, the method comprises providing a column separator connected to the separator tank, wherein the separator tank holds an oil-containing material therein. Vapor gas from the oil-containing material is introduced into the column separator. Liquid is condensed from the vapor gas in the column separator. Vapor gas that has undergone the condensation step from the column separator is removed, thereby separating the vapor gas emitted from the oil-containing material. In an embodiment, the oil containing material is heated to a temperature between about 71° C. (160° F.) and 82° C. (180° F.), depending on operating conditions, so that there is temperature gradient within the column separator, ranging from between about 43° C. (110° F.) to about 60° C. (140° F.) at the inlet to about 27° C. (80° F.) to about 54° C. (130° F.) at the outlet. In an embodiment, the temperature gradient is from about 52° C. (125° F.) inlet vapor gas to about 32° C. (90° F.) outlet vapor gas. An elevated temperature range improves the operating efficiency of the method, however, too high a temperature reduces condensation and operating efficiency. In addition, the temperature of the sales gas is often required to have a temperature of about 49° C. (120° F.) or less by gas seller.

In an embodiment, the method further comprises collecting the removed vapor gas. The collected gas can be piped to a natural gas pipeline, thereby generating an additional revenue stream to the traditional oil-sale revenue. Alternatively, at least a portion of the collected gas can be used to regulate the temperature of the oil-containing material. For example, at least a portion of the collected gas can be utilized to operate the device so that the collected vapor gas exits at a user-specified temperature, including an exit vapor gas temperature of less than about 49° C. (120° F.), and between about 32° C. (90° F.) and 49° C. (120° F.), by connecting at least a portion of the collected gas to heat-generating means.

In an embodiment, the method is for converting a conventional oil-production unit into a low-emission oil production unit by connecting any of the devices disclosed herein to a conventional oil-production unit, thereby providing a system and method for collecting vapor gas that is otherwise released (e.g., vented or burned) by the oil-containing material. In an embodiment, the low-emission oil production unit reduces vapor gas generated by oil produced by an oil-production unit by at least 50%. In an embodiment this reduction is greater than about 75%. In an embodiment this reduction is greater than about 95%.

BRIEF DESCRIPTION OF THE DRAWINGS

FIG. 1 is a series of photographs of a low emission oil-production unit. Each of FIGS. 1A-E is a different view of a low emission oil-production unit of the present invention.

FIG. 2A is a perspective view. FIG. 2B is a top view. FIG. 2C is a side view and shows select internal components. FIG. 2D is a view of the input end.

DETAILED DESCRIPTION OF THE INVENTION

The invention may be further understood by the following non-limiting examples. All references cited herein are hereby incorporated by reference to the extent not inconsistent with the disclosure herewith. Although the description herein contains many specificities, these should not be construed as limiting the scope of the invention but as merely providing illustrations of some of the presently preferred embodiments of the invention. For example, thus the scope of the invention should be determined by the appended claims and their equivalents, rather than by the examples given.

An "oil-containing material" refers to the liquid/gas removed from an oil-well, and can span the range from light to heavy crude. In addition, the oil-containing material extracted from the oil-well can comprise a water and oil mixture, a water, gas and oil mixture, or an oil and gas mixture.

"Vapor gas" is used herein to refer to dissolved gases within the oil-containing material that vaporize or "flash out" of the liquid oil-containing material. Vapor gas includes the hydrocarbons that vaporize from the oil-containing material. Vapor gas can contain liquids, including natural gas liquids. A "dried", or a "dryer" vapor gas refers to vapor gas that has undergone a condensation step and/or filter step to separate at least a portion of the liquid from the vapor gas. The filter step can utilize a mist pad to enhance liquid separation from the vapor gas.

As used herein, "conventional oil-production unit" refers to an oil-production unit that does not substantially reduce and/or recover vapor gas produced from an oil-containing material. Accordingly, the term encompasses a unit that produces oil that vents a substantial amount of vapor gas to the atmosphere. The term can also refer to units that burn vapor gas, rather than collecting them. Conventional oil-production units are known in the art (see, for example, Leed Fabrication Services, Inc., Brighton, Colo.). Generally, a conventional oil-production unit comprises a separation tank for separating oil from water, an output line for removing separated oil from the separation tank, and other components, as known in the art for ensuring safe and reliable operation of the unit.

A "low emission oil-production unit" refers to a device of the present invention that reduces the amount of dissolved gas within oil produced by an oil-production unit. Accordingly, the low emission unit can comprise a conventional unit connected to a device disclosed herein, so that produced oil has a lower level of dissolved hydrocarbon compared to oil produced from an oil production unit that does not comprise the present invention, or the amount of collected vapor gas generated by the oil-containing material is substantially greater than what is collected by use of a conventional oil-production unit. The low emission oil-production units of the present invention recover and collect natural production gas from the oil-production for sale and/or use as a fuel for regulating temperature of the unit. An oil-production unit of the present invention includes a unit that removes a measurable amount of vapor gas, such as at least 10%, preferably at least 50%, at least 75%, and at least about 95%, that is generated by an oil-containing material. Accordingly, the amount of hydrocarbon vapor gas dissolved within oil produced by an oil-production unit of the present invention is reduced by at least 10%, at least, 50%, at least 75%, at least 95% compared to oil produced by a conventional oil production unit that does not collect and/or remove vapor gas.

The term "spiral baffle" is used broadly herein to refer to any shaped element within the column separator that affects fluid flow, including gas flow, so that the effective distance a fluid particle travels in entering the column separator at the first end and exiting at the second end is greater than the distance separating the first end and the second end. This increase in path length is generated by the baffle imparting a generally "spiral" direction flow to the fluid. Such a spiral path allows the column separator to have a geometrical size that is practical for oil-production units. Spiral baffle encompasses an element that is continuous or alternatively an element that is discontinuous, so long as the discontinuities are spaced such that the effective path-length a fluid must traverse is greater than the distance separating the first and second ends of the column separator.

The amount of surface area of the spiral baffle that is perforated is preferably greater than about 15%, wherein the size of each individual perforation is less than about 5 cm, including less than about 2 cm, and less than about 1 cm. In an embodiment, the perforated area covers about 25% of the surface area of the spiral baffle. In an embodiment, the perforated area is greater than about 25%, including greater than about 45%, the surface area of the spiral baffle. The perforations are important for maximizing the efficiency of vapor gas recovery because they in part, along with the packing material, promote percolation of condensed gas and reflux wherein any vapor generated by condensed oil within the column is collected by gas flowing up the column. A constraint on the size of an individual perforation is that condensed oil in the column should cover the hole and provide a barrier to gas flowing up the column. If an individual perforation is so large that it is not covered by oil, the open perforation provides a bypass for gas flow, such that the effective path distance for gas flow decreases, thereby decreasing condensation and the efficiency and effectiveness of the device.

Helicoid flighting (Spiral Metals, LLC, Hector, Minn.) may be purchased and used as a spiral baffle. Perforations can be made by punching holes in the baffle. Alternatively, spiral baffles can be made by forcing two ends of a flat metal ring to different relative heights, and then connecting a plurality of these together end-to-end to form a spiral baffle. In this embodiment, the spiral baffle has an overall length, an outer and inner diameter, as well as a pitch that is defined as the longitudinal length required for one revolution of the baffle, whose dimensions are constrained by the size of the column separator and operating conditions of the unit.

FIG. 1 shows pictures of one embodiment of a low emission oil-production unit and contains five different views. FIG. 1A shows a low emission oil-production unit 3 that comprises a column separator 30 having a first end 32 connected to an oil production tank 20, and a second end to which a vapor gas outlet pipe 50 is connected. The outlet pipe 50 can be located at an orifice that spans the thickness of the column separator wall. In an embodiment, the outlet pipe is connected to a vapor remover that is connected to the top of column separator 30.

Figure 1A:
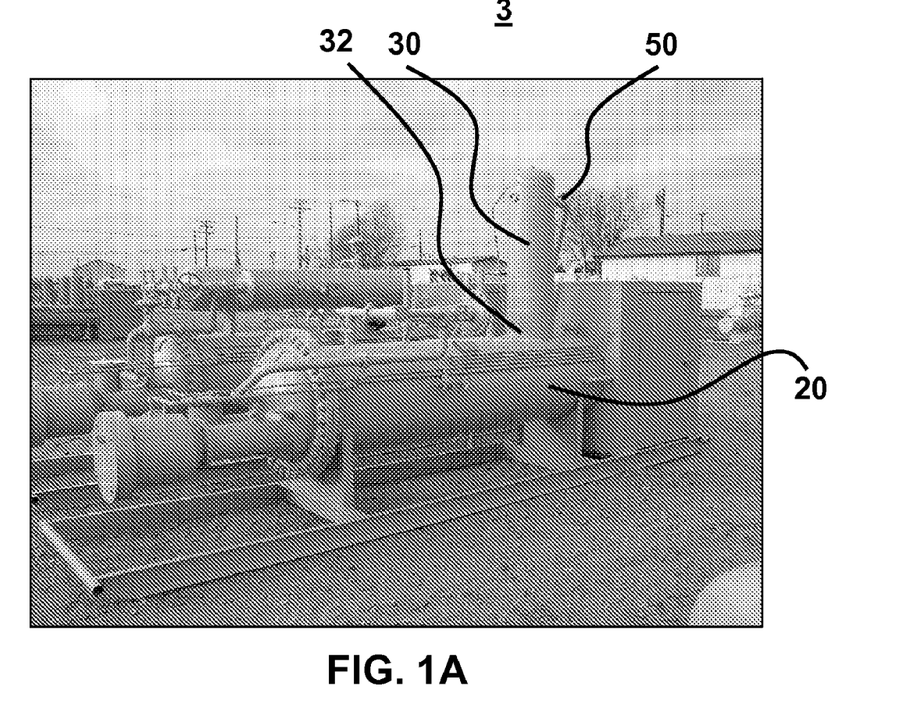
Figure 1B:
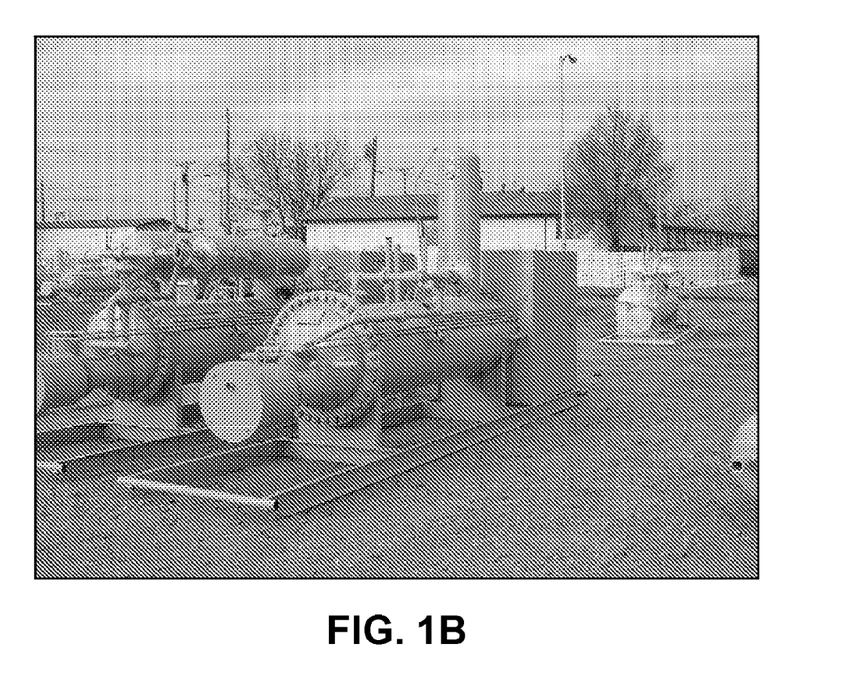
Figure 1C:
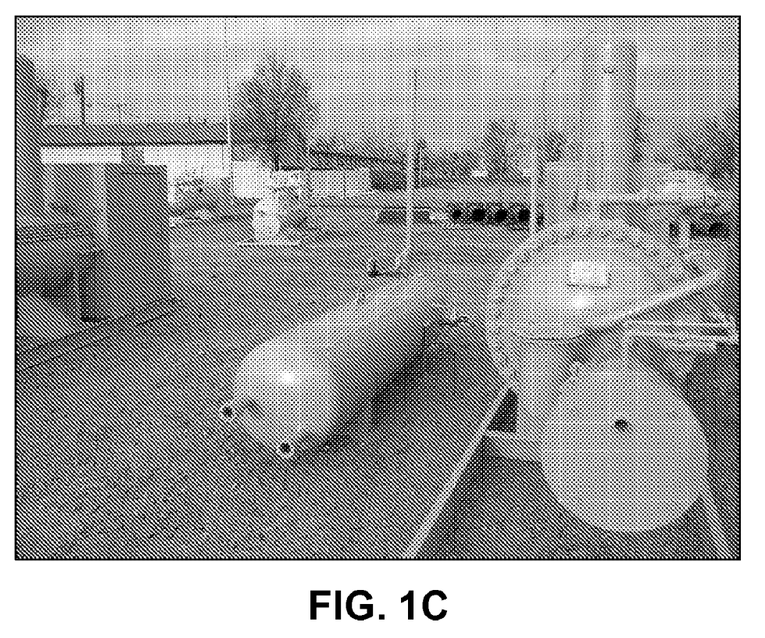
Figure 1D:
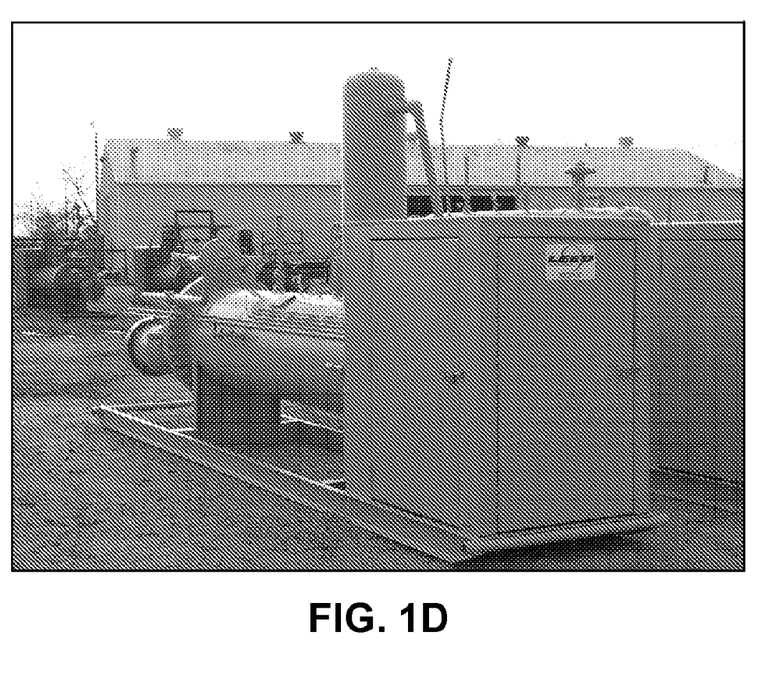
Figure 1E:
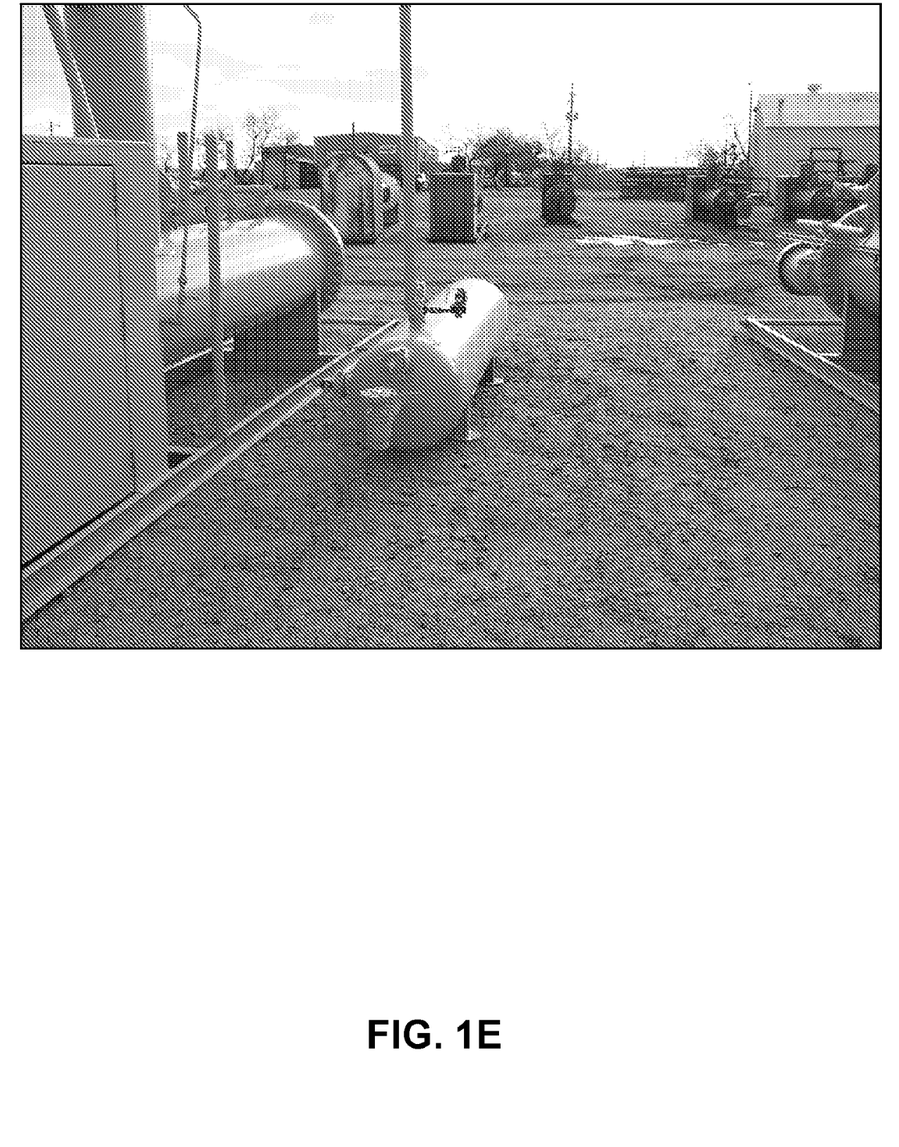
Figure 2:
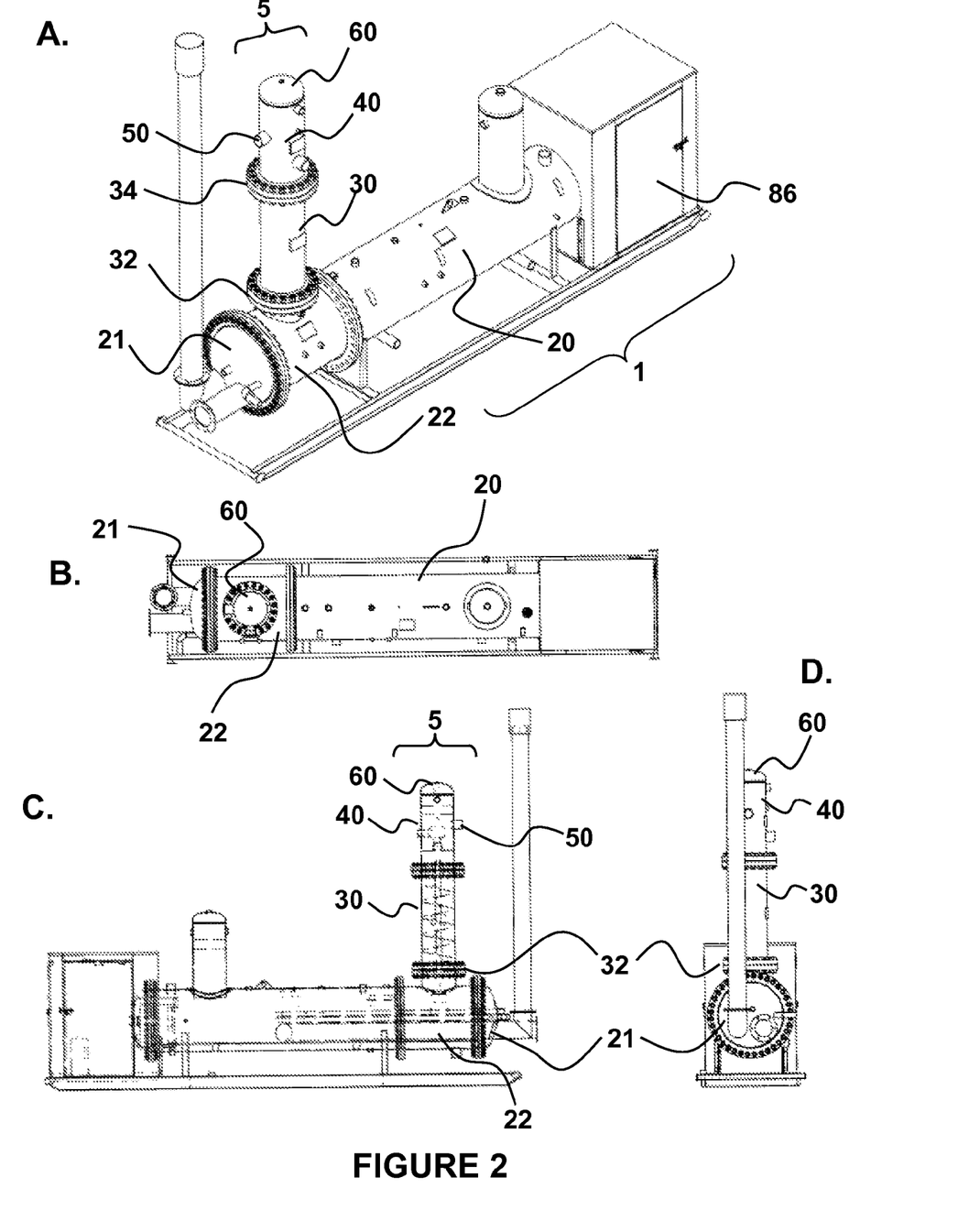
FIG. 2 shows a conventional oil production unit retrofitted with a device of the present invention to obtain a low emission oil production unit.

FIG. 2 shows one embodiment of the present invention for use in retrofitting a conventional oil production unit 1. In this embodiment, an oil production unit 1 is retrofitted by incorporating a low emission element 5 between the conventional oil-production unit separator tank 20 and input end 21, thereby converting a "regular" oil-production unit to a "low emission" oil-production unit. In the embodiment shown in FIG. 2, the low emission element 5 comprises a separator tank 22, a column separator 30, and a vapor gas removal element 40 capped by a gas dome 60. Specifically, the input end 21 is disconnected from the first separator tank 20, and the low emission element unit 5 inserted between end 21 and original separator tank 20. If there is not a convenient or readily accessible and removable input end 21, an opening is made to separator tank 20 at the top surface for receiving a first end 32 of column separator 30 such that the effective volume of the separator tank is unchanged. Alternatively, separator tank 20 can be circumferentially cut and connected to separator tank portion 22 of the low emission element 5, thereby increasing the volume of the separator tank.

In the embodiment shown in FIG. 2A, the low emission element 5 comprises a column separator 30 having a first end 32 connected to a storage tank 22 and a second end 34 connected to a vapor gas remover 40. In an embodiment, the column separator is cylindrical. In an embodiment, the vapor gas remover comprises means for removing vapor gas from the interior of the low emission element 5. In the simplest embodiment, this means comprises a passage through the wall of vapor gas removal element 40. To increase the efficiency of removal of dry vapor gas, the means can be a vapor gas outlet pipe 50 having a downward direction in the interior of removal element 40 (see FIG. 3). FIGS. 2B-D show different views of an oil production unit 10. FIG. 2C shows select elements contained within the column separator 30, as further described in FIG. 3.

Figure 3:
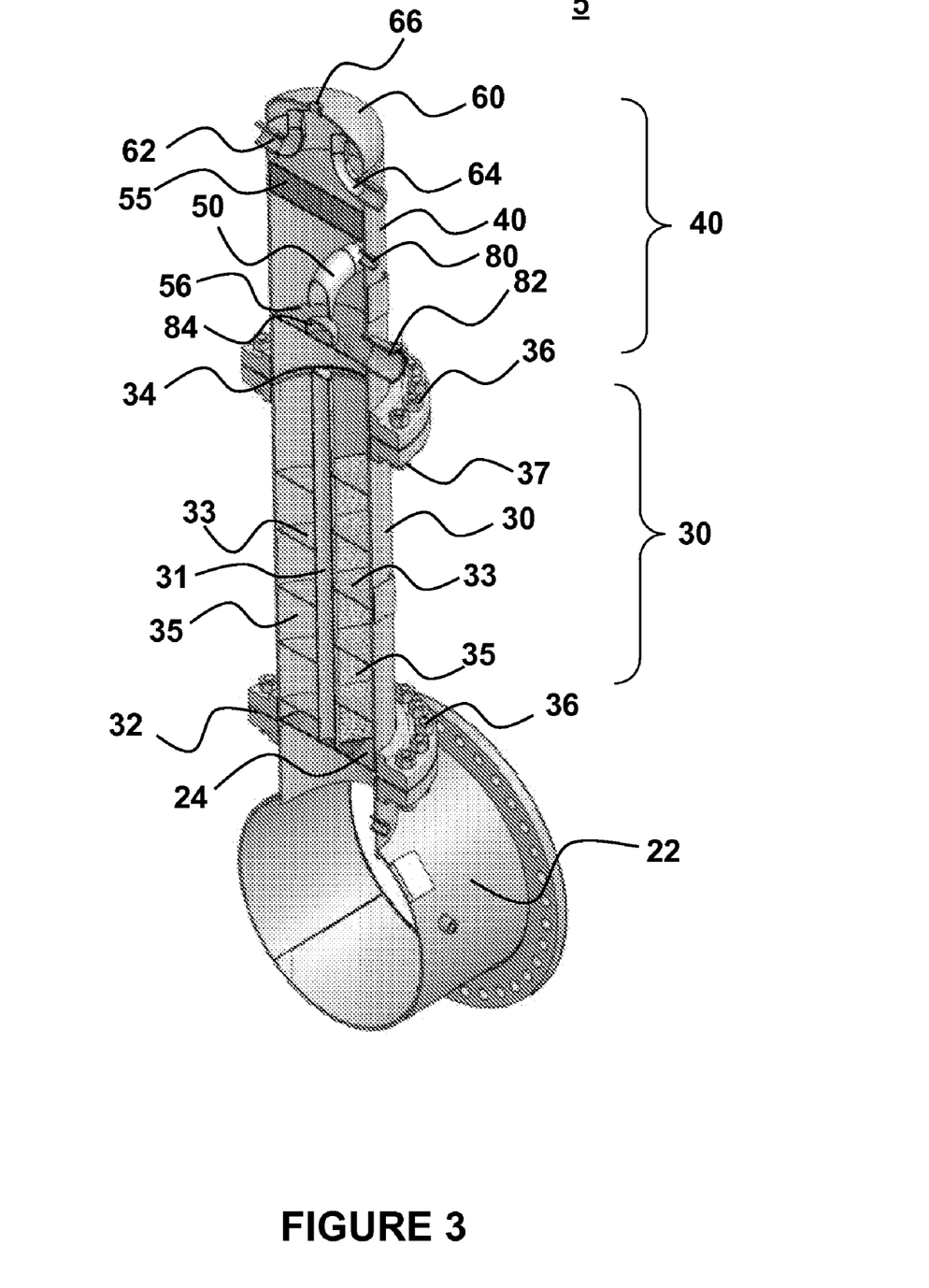
FIG. 3 is a cut-away perspective view of the low emission element.

FIG. 3 is a cutaway view of one embodiment of a low emission element 5 that is cylindrically-shaped. In an embodiment, the separator column 30 has an inner and outer diameter. A pipe 31 whose diameter is less than the inner diameter of column 30, is substantially centered on the central axis of column separator 30, so that pipe 31 is substantially concentric with respect to column separator 30. The pipe 31 is either solid or capped, around which a baffle 33 traverses. In an embodiment, the baffle 33 is continuously helical and perforated. Pipe 31 and spiral baffle 33 traverse at least a portion of the longitudinal length of column separator 30. The outer dimension of spiral baffle 33 corresponds to the inner dimension of column separator 30, such that baffle 33 is a tight slide-fit into column separator 30. In an embodiment, the column separator 30 cross-sectional shape is circular, so that the outer diameter of spiral baffle 33 is equal, or slightly less than the internal diameter of column separator 30, such that the baffle 33 is able to slide, with a tight fit, into the space defined between pipe 31 and the wall of column separator 30. Spiral baffle 33 has a central bore whose diameter is equal to, or slightly greater than, the diameter of the pipe 31 to provide a tight fit. As used herein, "tight fit" refers to baffle 33 not being able to move without an external force applied to baffle 33. With such a tight fit, gas tends not to transit between the outer edge of baffle 33 and inside wall of column separator 30. Instead, vapor gas generated by a liquid material held within storage tank 22 tends to traverse the cavity 35 in a helical direction from first end 32 to second end 34. Such a motion increases the distance, and correspondingly, the residence time of vapor gas within the column separator 30, thereby improving condensation of liquid from the vapor gas. Perforations within the spiral column facilitate the return of condensed liquid to storage tank 20/22 via gravity. The tight fit of the spiral baffle 33 with the pipe 31 and inner wall surface of column separator 30 assists in drainage of condensed liquid through the perforations, rather than at the edges of baffle 33. Because the liquid condensate remains within the interior of column separator 30, the condensate is used to further reflux vapor gas. In addition, condensed liquid tends to form a barrier across perorations and hinder or prevent gas flow from bypassing the helical pathway defined by cavity 35 and flowing directly along the longitudinal axis of the column separator.

First 32 and second 34 ends of column separator 30 connect to separator tank 22 and vapor gas remover 40, respectively, by any means known in the art including, but not limited to, fasteners, bolts, adhesives, and/or welds. In an embodiment, the column separator 30 and vapor gas remover 40 are both contained in a single housing. FIG. 3 shows an embodiment where the column separator ends 32 and 34 are connected to tank 22 and vapor gas removal assembly 40 by bolts 36 and nuts 37. One advantage of such fastening means is that the pieces can be disconnected to facilitate cleaning, upkeep, repair and replacement of internally-located elements. The particular fastening means encompass any known in the art, including permanent means such as welds and adhesives as well as reversible connection means including but not limited to fasteners, clasps and screws. Optional elements include a plurality of ports to facilitate further process control, including a temperature port 80, a clean-out port 82, a liquid distributor 84, as well as other optional ports 62, 64 and 66 to facilitate other measuring, safety and processing features common to oil-production units (e.g. back pressure regulator outlet line, gas driver to fuel temperature control, gas sales line).

Figure 4:
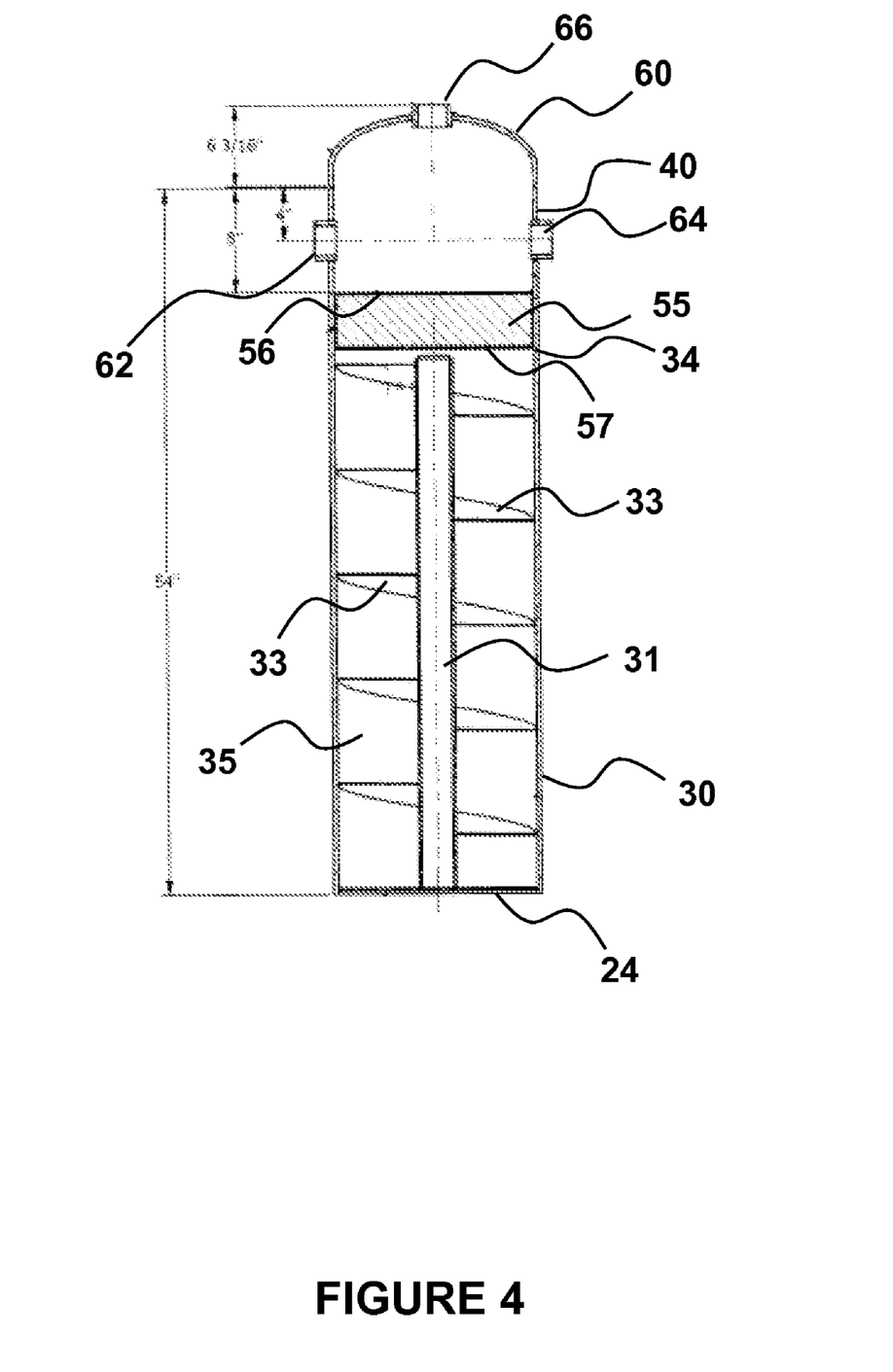
FIG. 4 is a longitudinal cross sectional view of the column separator and vapor gas outlet element.

In the embodiment depicted in FIGS. 3 and 4, cavity 35 is helically-shaped, with the cavity volume 35 constrained by the surface of pipe 31, inward-facing wall of column separator 30 and the upward and downward facing surfaces of spiral baffle 33. The cavity 35 is packed with a packing material to increase drag on vapor gas traversing along the cavity 35 from first end 32 to second end 34, thereby increasing the separation efficiency of the liquid phase from the vapor phase by enhancing condensation. The result is a relatively clean and dry gas exiting second end 34 and liquid natural gas condensate being returned to the liquid oil storage tank 20 and/or 22. For clarity, the packing material contained within cavity 35 is not shown. In an embodiment the packing material comprises pall rings (Amistco, Alvin, Tex.). Briefly, the cavity 35 is packed as follows: A nut is connected to pipe 31 to facilitate uniform distribution of packing material within cavity 35. The nut provides a handle to assist in shaking the spiral baffle. The pipe 31 and baffle 33 are inserted into the vertical column separator 30 to rest on a grate 24 located at the first end 32 of the column separator 30. This grate can be identical or similar to grate 57 described below. A plurality of packing material is loaded from the top of the column (e.g. second end 34), and an impact wrench or other force is used to shake and disperse the packing material throughout cavity 35, thereby ensuring at least a portion of the column cavity 35 is thoroughly packed without any substantial dead space. The total number of packing elements to thoroughly pack the column 30 is calculated from the total volume of cavity 35 and the volume of an individual packing element. The packing material is constructed from any suitable material, including, ceramic, polymer, carbon, stainless steel, aluminum, etc. that do not degrade when exposed to the operating conditions (e.g. exposure to warm temperatures, oils and vapor gas). In an embodiment, the packing material is a pall ring. Any packing material that increases the drag on fluid flow up column 30 while minimizing the force required to move vapor gas from first end 32 to second end 34 is suitable. Other examples include, but are not limited to, Raschig ring, Lessing ring, partition ring, and/or Pall ring.

In an embodiment, the packing elements comprise high-performance pall rings. The packing can vary in size and composition to enhance reflux action of vapor gas flowing over condensed oil. In an embodiment, the pall ring is made of 304 stainless steel, 316 stainless steel, or ceramic.

FIG. 4 shows further details of the vapor removal element 40. In an embodiment, mist pad 55 and grate 57 are located at the second end 34 of the column separator 30. Mist pad 55 and grate 57 fit the internal diameter of column separator 30. The grate 57 supports mist pad 55. In an embodiment, grate 57 is 3# grate spacing, cut to 15¼" outer diameter and is SA-36 steel. The mist pad 55 can be located above or below grate 57. In an embodiment the mist pad 55 is located below grate 57. In an embodiment, mist pad 55 is adjacent to, and in contact with, grate 57. In an embodiment, mist pad 55 is sandwiched between a pair of grates 56 and 57 to assist in securing mist pad 55. As shown in FIG. 3, the mist pad 55 can be separated by a distance from the column separator second end 34.

In an embodiment the column separator 30 shape is cylindrical having an inner diameter and outer diameter. The outer and inner diameters of the column separator 30 can be of any dimension, so long as the column separator is functional. As used herein, functional means that vapor gas produced by oil output from the unit is reduced by at least 10% relative to the vapor gas produced by oil output from a conventional unit unit. In an embodiment, functional means the relative reduction in vapor gas emissions is at least 25%, or at least 50%, or at least 75%, or at least 95%. In an embodiment, column separator 30 has an external diameter of between about 15 cm (6") and 91 cm (36") and a wall thickness of between 0.32 cm (⅛") and 2.5 cm (1"). In an embodiment the internal diameter of the column separator 30 is 39 cm (15¼") and has a wall thickness of 1 cm (⅜"), corresponding to a 40 cm (16") outer diameter. In an embodiment, mist pad 55 is between about 10 cm (4") and 15 cm (6") thick with nominal outer diameter of 39 cm (15¼").

One face of the mist pad 55 and grating 57 face the direction of column separator 30 and the opposing face is directed to the vapor gas removal element 40. Accordingly, mist pad 55 ensures mist elimination from vapor gas, thereby assisting in vapor gas drying. The dried vapor gas within vapor removal element 40 is removed and/or collected from the low emission element unit 5 by a vapor gas outlet pipe 50. The vapor gas removal element 50 can be capped with a gas dome 60. In an embodiment, the gas dome 60 is a pipe cap welded to, and having equivalent dimensions to, the gas removal element 40.

Figure 5:
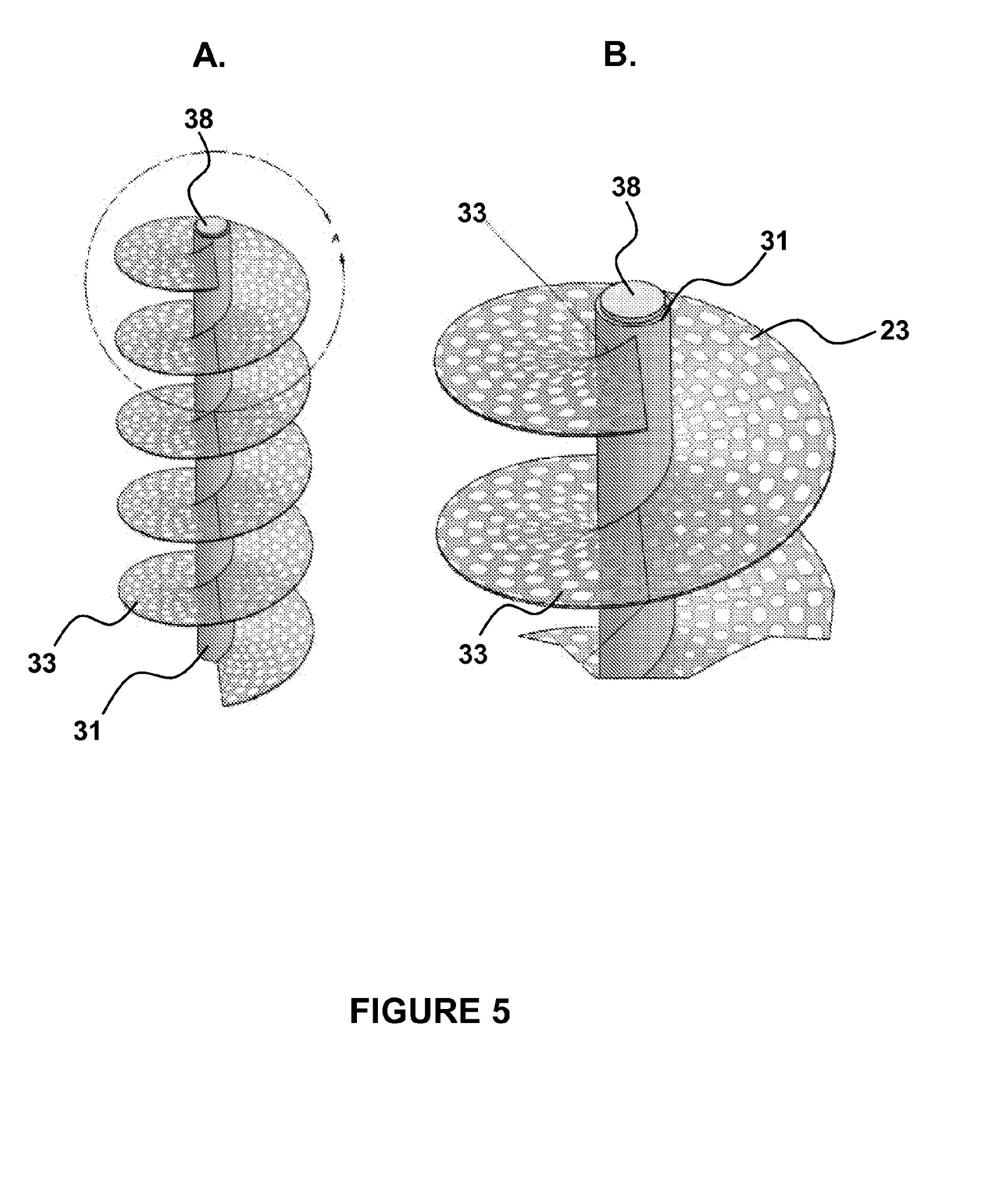
FIG. 5 is a perspective view of a helical, perforated baffle having a central bore containing pipe. (A) shows an entire length of pipe and spiral baffle that can be inserted into a column separator, wherein the spiral baffle length contains five complete turns around the pipe. (B) is a view of the dashed region labeled A in FIG. 4A.

FIG. 5 is a close up view of spiral baffle 33 having a plurality of perforations 23. The perforated spiral baffle 33 can be a single piece adjacent to pipe 31, or may be constructed of a plurality of baffles 33. The pipe 31 can be solid or hollow. In an embodiment where the pipe 31 is hollow, one or both of the pipe ends are capped with a pipe cover 38. The particular shape and/or total perforated area are not important so long as condensate can drain through the perforations and back toward the storage tank. Preferably, the perforations are uniformly distributed along the length of the spiral baffle and cover between about 20% and 50% the surface area of the baffle.

The present invention reduces oil tank vapor gas. In an embodiment, oil tank vapor gas is reduced by greater than 30%. In an embodiment, oil tank vapor gas is reduced by greater than 50%. In an embodiment, oil tank vapor gas is reduced by greater than 75%. In an embodiment oil tank vapor gas is reduced by between 75% and 90%. In an embodiment, vapor gas reduction is greater than 90%. Vapor gas quantity and/or composition are measured by means known in the art. For example, by a Western Research Meter (Western Research Institute, Laramie, Wyo.).

Typical oil-containing material within a storage tank generate about 235 SCF or more of vapor gas per barrel of oil produced. In an embodiment, the present invention reduces this to about 50 SCF per barrel (corresponding to 78.7% reduction in vapor gas).

In combination with other equipment, typical units disclosed herein indicate that fuel gas used by the unit is reduced approximately 50%. This fuel gas reduction is accomplished by the LEE VGR Flash Absorber through partial burning of waste vapor gas recycled as fuel and conserving BTUs through back exchange of inlet gas to the production unit, sending lower temperature oil to the tank.

In an embodiment, the invention additionally provides better oil and water separation. Typical oil tanks average 0.5 to 0.7 BS&W (Basic Sediment & Water). In an embodiment, the LEE VGR Device decreases BS&W to less than 0.1 as a result of the higher operating temperature of the unit.

In a preferred embodiment, the LEE VGR Tower operates at a higher temperature than the operation temperature of a conventional separator. If the temperature is too low, more vapors may be generated. Although a higher operating temperature is preferred, the invention uses less fuel gas because of BTU conservation by back exchange of inlet gas to the production unit, sending lower temperature oil to the tank.

In an embodiment, the low emission element (LEE) VGR Flash Absorber is not started until the operating temperature is reached. Low temperature startups may vapor lock the flash absorber causing the production unit to flood. Vessel may reach a temperature where personnel must be protected by leaving the house doors 86 (see FIG. 2A) ajar while operating and/or insulating the vessel or using special hand protection. The invention is particularly useful for removal of dissolved hydrocarbon in an oil-containing material that is stored in a storage container on-site at the oil-well.

When a Markush group or other grouping is used herein, all individual members of the group and all combinations and subcombinations possible of the group are intended to be individually included in the disclosure. Whenever a range is given in the specification, for example, a temperature range, an efficiency range, a time range, or a size range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In general the terms and phrases used herein have their art-recognized meaning, which can be found by reference to standard texts, journal references and contexts known to those skilled in the art. The definitions provided herein are to clarify their specific use in the context of the invention.

All patents and publications mentioned in the specification are indicative of the levels of skill of those skilled in the art to which the invention pertains.

One skilled in the art would readily appreciate that the present invention is well adapted to carry out the objects and obtain the ends and advantages mentioned, as well as those inherent therein. The devices, methods and accessory methods described herein as presently representative of preferred embodiments are exemplary and are not intended as limitations on the scope of the invention. Changes therein and other uses will occur to those skilled in the art, which are encompassed within the spirit of the invention, are defined by the scope of the claims.

Although the description herein contains many specificities, these should not be construed as limiting the scope of the invention, but as merely providing illustrations of some of the embodiments of the invention. Thus, additional embodiments are within the scope of the invention and within the following claims. All references cited throughout this application, for example patent documents including issued or granted patents or equivalents; patent application publications; and non-patent literature documents or other source material are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference). Some references provided herein are incorporated by reference herein to provide details concerning alternative structure, materials and additional uses of the invention.

We claim:

1. A device for removing vapor gas generated by an oil-containing material comprising:
   a column separator having a first end and a second end, wherein said vapor gas enters said column separator at said first end and said vapor gas exits said column separator at said second end, wherein said column separator has a cross-sectional shape defined by an inner surface of said column separator when viewed from the top that is circular;
   a pipe positioned concentric to said column separator, said pipe having a pipe diameter; and
   a perforated spiral baffle positioned within said column separator, said perforated spiral baffle having a central longitudinal bore for receiving said pipe, wherein at least a portion of said perforated spiral baffle and said column separator is packed with a packing material;
   wherein said central longitudinal bore has a diameter that is substantially equivalent to said pipe diameter so that said perforated spiral baffle extends from said pipe to said column separator inner surface.

2. The device of claim 1 further comprising a separation tank for holding said oil-containing material operably connected to said first end.

3. The device of claim 2 further comprising a vapor gas remover connected to said second end.

4. The device of claim 1 wherein said first end is operably connected to an oil-production unit.

5. The device of claim 1 wherein said packing material comprise pall rings.

6. The device of claim 3 wherein said vapor gas remover comprises:
   a. a grate separating said column separator second end from said vapor gas remover;
   b. a mist pad adjacent to said grate; and
   c. a vapor gas outlet orifice for removing said vapor gas from said vapor gas remover.

7. The device of claim 6 further comprising a pipe connected to said outlet orifice for collecting said removed vapor gas.

8. The device of claim 2, further comprising a conventional oil-production unit, wherein said separation tank is operably connected to said conventional oil-production unit.

9. A device for removing vapor gas generated by an oil-containing material comprising:
   a column separator having a first end, a second end, an inner surface and a longitudinal axis that spans the distance between said first end and said second end, wherein said column separator is cylindrical;
   a pipe having a pipe diameter positioned concentrically in said column separator and traversing at least a portion of said longitudinal axis;
   a perforated spiral baffle located between said first end and said second end, said perforated spiral baffle having a length that spans at least a portion of said longitudinal axis, and a central longitudinal bore for receiving said pipe; and
   a packing material spanning at least a portion of said perforated spiral baffle length;
   wherein said central longitudinal bore has a diameter that is substantially equivalent to said pipe diameter so that said perforated spiral baffle extends from said pipe to said column separator inner surface.

10. The device of claim 9 further comprising a separator tank for holding the oil-containing material, wherein the separator tank is connected to said column separator first end so that vapor gas generated by the oil-containing material is introduced to said column separator at said first end.

11. The device of claim 9 wherein said packing material comprises a plurality of pall rings.

12. The device of claim 9, wherein said pipe is hollow and one or both ends of said pipe are capped with a pipe cover.

13. The device of claim 9 further comprising a vapor gas remover having a wall connected to said column separator second end, wherein said vapor gas remover comprises:
   a. a grate separating said column separator second end from said vapor gas remover;
   b. a mist pad adjacent to said grate; and
   c. an orifice that traverses said vapor gas remover wall to remove said vapor gas from the interior of said vapor gas remover.

14. The device of claim 9, further comprising an oil-production unit connected to said column separator first end.

15. The device of claim 1, further comprising a temperature port connected to the column separator to regulate a column separator operating temperature selected from between about 80 to about 160 degrees Fahrenheit.

16. A method for separating a vapor gas generated from an oil-containing material in a separator tank comprising:
   providing a packed perforated spiral baffle column separator connected to said separator tank, wherein said separator tank holds an oil-containing material and said packed perforated spiral baffle column separator comprises:
   a column separator having a cylindrical volume defined by an inner surface;
   a pipe concentrically positioned in said cylindrical volume; and
   a perforated spiral baffle having a longitudinal bore for receiving the pipe, wherein the longitudinal bore has a diameter that is substantially equivalent to said pipe diameter, and said perforated spiral baffle extends from said pipe to said column separator inner surface;
   introducing vapor gas generated from said oil-containing material into said packed perforated spiral baffle column separator;
   condensing liquid from said vapor gas in said packed perforated spiral baffle column separator; and
   removing said vapor gas of step (c) from said column separator, thereby separating said vapor gas generated from said oil-containing material.

17. The method of claim 16 further comprising heating said oil-containing material so that the temperature of vapor gas entering said packed perforated spiral baffle column separator is between about 100 degrees Fahrenheit to 160 degrees Fahrenheit.

18. The method of claim 16 further comprising collecting said removed vapor gas.

19. A method of converting a conventional oil-production unit into a low-emission oil production unit comprising connecting the device of claim 1 to said conventional oil-production unit.

20. The method of claim 19 wherein the low-emission oil production unit reduces the volume of vapor gas generated by produced oil by at least 50% relative to the volume of vapor gas generated by produced oil from a conventional oil production unit.

21. The method of claim 20 wherein the reduction is greater than 75%.

22. The method of claim 20 wherein the reduction is greater than 95%.

23. The device of claim 1 wherein the column separator has a volume, and wherein at least 80% of the column separator volume is packed with said with said packing material.

24. The device of claim 1, wherein said perforations are uniformly distributed along said perforated spiral baffle and cover between 20% and 50% of the surface area of a corresponding spiral baffle that is not perforated.

25. The device of claim 24, wherein an individual perforation has a size that is less than 2 cm.

* * * * *

UNITED STATES PATENT AND TRADEMARK OFFICE
CERTIFICATE OF CORRECTION

| | | |
|---|---|---|
| PATENT NO. | : 7,780,766 B2 | Page 1 of 1 |
| APPLICATION NO. | : 11/688947 | |
| DATED | : August 24, 2010 | |
| INVENTOR(S) | : Thompson | |

It is certified that error appears in the above-identified patent and that said Letters Patent is hereby corrected as shown below:

In the Specification:

In claim 16, column 14, line 65, please replace "vapor gas of step (c) from said" with --vapor gas from said--.

In claim 23, column 16, line 7, please replace "packed with said with said packing material" with --packed with said packing material--.

Signed and Sealed this
First Day of May, 2012

David J. Kappos
*Director of the United States Patent and Trademark Office*